United States Patent [19]
Reudink

[11] Patent Number: 6,061,548
[45] Date of Patent: May 9, 2000

[54] TDMA REPEATER ELIMINATING FEEDBACK

[75] Inventor: Douglas O. Reudink, Bellevue, Wash.

[73] Assignee: Metawave Communications Corporation, Redmond, Wash.

[21] Appl. No.: 08/895,734

[22] Filed: Jul. 17, 1997

[51] Int. Cl.$^7$ ...................................................... H04B 3/36
[52] U.S. Cl. ................................ 455/18; 455/16; 455/13.1
[58] Field of Search ............................... 455/18, 16, 25, 455/24, 7, 13.1

[56] References Cited

U.S. PATENT DOCUMENTS

| | | | |
|---|---|---|---|
| 4,456,988 | 6/1984 | Nakagome et al. | 455/24 |
| 4,475,246 | 10/1984 | Batlivala et al. | 455/18 |
| 4,639,937 | 1/1987 | McRae et al. | 375/40 |
| 5,113,394 | 5/1992 | Kotzin | 455/18 |
| 5,398,129 | 3/1995 | Reiman | 359/137 |
| 5,606,555 | 2/1997 | Singer | 370/465 |
| 5,652,765 | 7/1997 | Adachi et al. | 455/18 |
| 5,835,848 | 11/1998 | Bi et al. | 455/24 |

*Primary Examiner*—David R. Hudspeth
*Assistant Examiner*—Daniel Abebe
*Attorney, Agent, or Firm*—Fulbright & Jaworski L.L.P.

[57] ABSTRACT

A system and method for providing a re-transmitted signal substantially free of feedback is disclosed. According to a preferred embodiment of the present invention, a delay is utilized with select burst periods of a TDMA signal so as to re-transmit these burst periods coincident with a subsequent burst period of the original signal. Accordingly, the re-transmitted signal of the present invention is decoupled from the input of the original signal.

63 Claims, 5 Drawing Sheets

TDMA REPEATER ELIMINATING FEEDBACK

RELATED APPLICATIONS

Reference is hereby made to the following co-pending and commonly assigned U.S. Patent application: METHOD AND APPARATUS FOR IMPROVED CONTROL OVER CELLULAR SYSTEMS, Ser. No. 08/582,525, the disclosure of which application is incorporated herein by reference.

TECHNICAL FIELD OF THE INVENTION

The present invention relates generally to a system and method for providing re-transmission of signals and more specifically to a system and method providing decoupled re-transmission of an input signal in order to eliminate feedback.

BACKGROUND OF THE INVENTION

Devices that receive signals in one circuit and automatically deliver corresponding signals to one or more other circuits are well known in the art. For example signal repeaters are often used with telephonic circuits, usually amplifying the signal, in order to extend the distance over which a voice signal may be usefully transmitted. Here a signal transmitted though a first circuit is provided to the repeater to be re-transmitted through a second circuit.

These prior art repeaters provide an output signal directly coupled to the input signal being re-transmitted. Therefore, as information appears at the input of such a repeater, so to does this information appear at the output in the form of a re-transmitted signal.

However, this direct coupling of the input and output signals is unacceptable in certain situations. Where the output signal is directly coupled to the input signal, undesired feedback can result. This is so because, by definition, the second circuit is directly coupled to the first circuit in order to provide re-transmission of the input signal. Therefore, where there is also direct coupling of the first circuit to the second circuit a feedback loop, in which the re-transmitted signal may again appear at the first circuit for input into the repeater, is created.

Uncontrolled feedback loops may cause the repeater to become unstable. For example, where the repeater provides amplification of the re-transmitted signal, the feedback loop may, in a very short time, cause the output signal amplitude to cascade, driving the signal beyond the capability of the repeater. Likewise, where the repeater provides a phase or frequency shift in the re-transmitted signal, nulls or otherwise undesirable re-transmitted signals may result from this feedback loop.

It should be appreciated that the aforementioned feedback loops are not a problem in many applications as the first and second circuits are closed and, thus, provide no opportunity for the first circuit being directly coupled to the second circuit. For example, in many telephonic repeater applications the first and second circuits are wireline transmission circuits which are easily decoupled from one another.

However, there are many applications requiring re-transmission of signals in which the aforementioned coupling is present. For example, wireless telecommunications, such as cellular telephony, provides for the transmission of telephonic signals via radio waves. Therefore, re-transmission of such signals is often accomplished via radio wave. However, as the first transmission circuit includes an air-gap and the second transmission circuit also includes an air-gap, direct coupling of these circuits in the form of a feedback loop is common.

In order to avoid undesired feedback, for the reasons discussed above, the input signal must typically be decoupled from the re-transmitted signal. Such decoupling has included such techniques as re-transmission of the signal at a different frequency than the input signal or providing directional re-transmission so as to prevent feedback. Similarly, other techniques, such as reducing the re-transmission power level, have been used to minimize the effects of signal feedback.

However, the prior art techniques of limiting feedback have proved to be less than ideal. For example, in cellular telephony it is often not desirable to provide a re-transmitted signal at a different frequency as such may make both the original and re-transmit frequencies unavailable for use throughout a particular region. Additionally, the use of such different frequencies typically requires additional communication management in order to control the operation of a unit operating through the re-transmitted signal.

Likewise, providing directional re-transmission of the signal is often undesirable as such may cause the re-transmitted signal to insufficiently cover a service area. For example, terrain conditions may cause an irregular shadow in the original signal's radiation pattern. Very often such an irregular pattern is difficult, if not impossible, to properly illuminate with a re-transmitted signal when constrained so as not to provide coupling with the repeater's input.

Similarly, adjustment of the power level of the re-transmitted signal so as to minimize the effects of feedback is often unacceptable. As above, such adjustment often provides inadequate or otherwise undesirable illumination of an area to be covered by the re-transmitted signal.

Therefore, a need exists in the art for a system and method for providing a re-transmitted signal without introducing an unwanted feedback.

A further need in the art exists for a system and method for providing a signal repeater having an output signal decoupled from the input signal.

A still further need exists in the art for providing a decoupled re-transmitted signal requiring a minimum of input signal manipulation so as to provide seemingly transparent signal re-transmission to an intended recipient.

SUMMARY OF THE INVENTION

These and other objects, features and technical advantages are achieved by a system and method which provides a predetermined delay to the re-transmission of an input signal. Switching or attenuation circuitry is used in order that the input signal may be selectively blocked from processing for re-transmission during such times as when re-transmission of a delayed input signal is occurring.

When operated in a communication system utilizing time division multiple access (TDMA), for example, the present invention delays re-transmission of an input signal for a time interval synchronized with the TDMA burst periods. As such, a signal appearing within a particular burst of a TDMA frame may be accepted by the present invention, delayed a single burst period, for example, and re-transmitted during a next burst period. During re-transmission of the delayed signal, the present invention does not accept input signals for re-transmission and thus provides an input decoupled from the output.

Presumably, the burst period, during which signal re-transmission is occurring and, therefore, acceptance of input signals is terminated, includes information not associated with the signal for which re-transmission is being conducted. As such, undesired signal feedback is avoided without the loss of any information relevant to the re-transmitted signal.

Therefore, a technical advantage of the present invention is that the re-transmitted signal does not require restrictions as to direction, frequency, and/or power in order to avoid feedback.

A further technical advantage of the present invention is realized in the fact that a re-transmitted signal may be provided within the radiation pattern of the original signal without the original and re-transmitted signals interfering.

A further technical advantage is provided in that the re-transmitted signal is merely a time shifted version of the original signal and, therefore, may be utilized by an intended recipient with a minimum of control intervention. As such, the use of the present invention may be made transparent to the intended recipient without requiring any modification or alteration of a receiving unit.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1A:
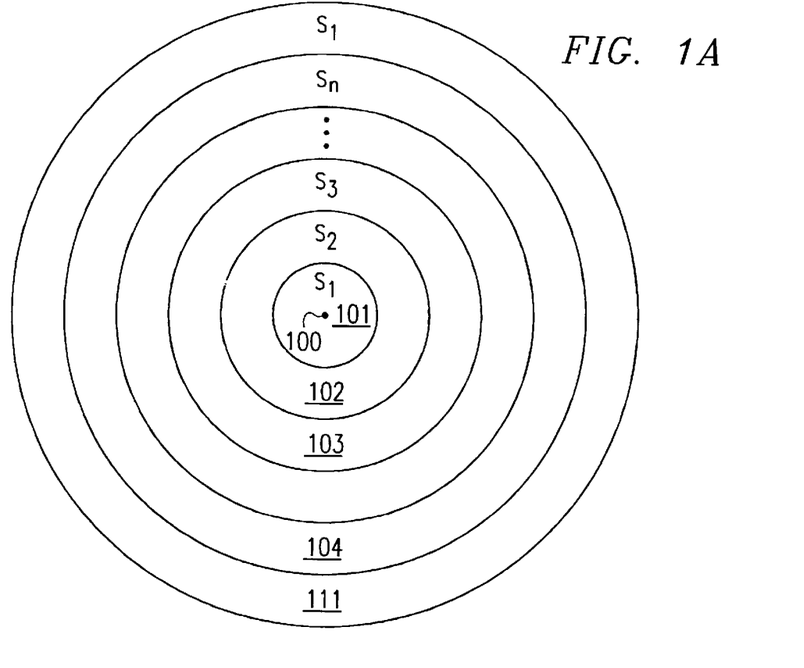
FIGS. 1A and 1B illustrate the radiation of a TDMA signal from a base site.
Figures 2, 3A:
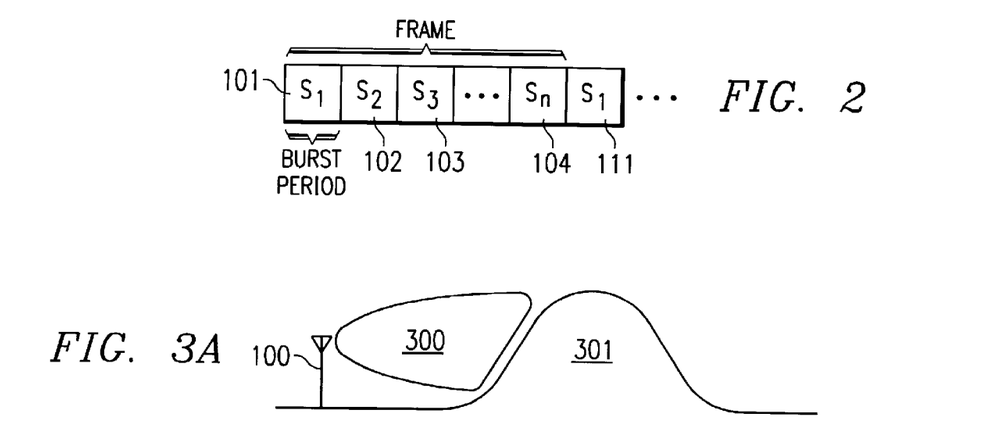
FIG. 2 illustrates a timing diagram of a TDMA frame.
FIGS. 3A, 3B, and 3C illustrate various obstructions which may impede transmission of a signal from a base site.

Directing attention to FIG. 1A, a wireless communication site is illustrated as base site 100. Here signals are communicated 360° azimuthally about site 100 (i.e., omni-directionally). The use of TDMA in the communicated signals is illustrated as burst periods 101–104 and 111 radiating from site 100. It shall be appreciated that, as illustrated in FIG. 2, a TDMA frame is defined by burst periods 101–104 which are communicated in a predetermined sequence. Accordingly, multiple access may be provided by communication of signals associated with various users within the burst periods of the frame (illustrated here as signals $S_1$–$S_n$).

Figure 1B:
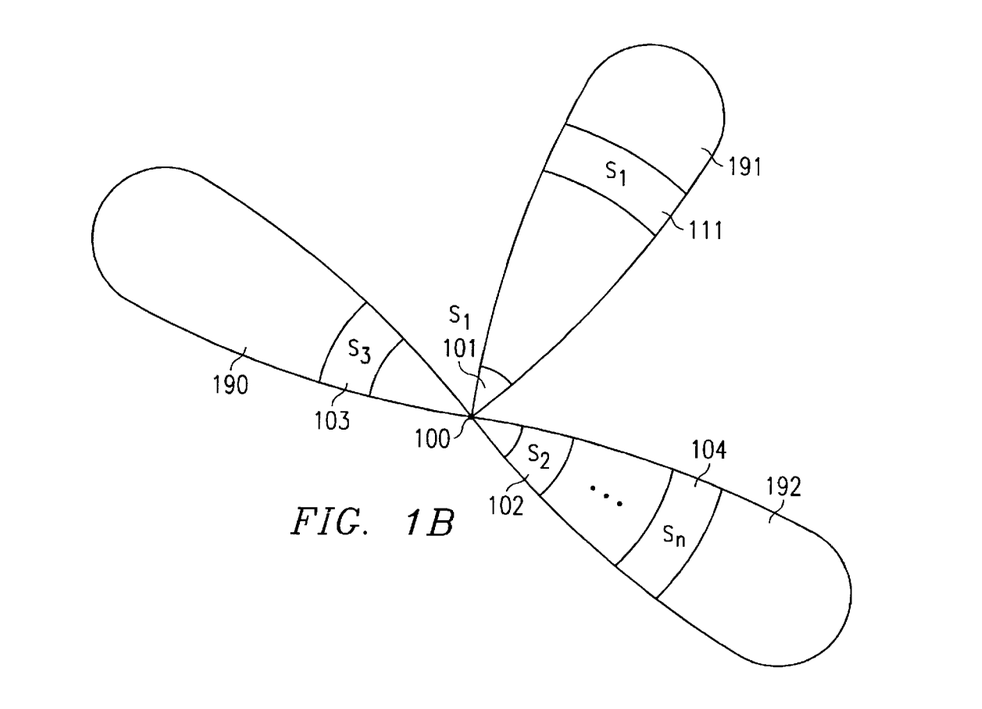

Directing attention now to FIG. 1B, wireless communication base site 100 is shown providing multiple directional radiation patterns or beams. There may be any number of such multiple beams, although only beams 190–192 are illustrated for clarity. Furthermore, the multiple beams of site 100 may be sufficiently broad and/or sufficient in number to provide a composite radiation pattern azimuthally illuminating 360° about the site. However, it shall be appreciated that site 101 providing a multi-beam radiation pattern may restrict communication of information associated with particular burst periods to within predefined areas as illustrated in FIG. 1B. The advantages of such restriction of communication will be discussed in further detail below.

Although generally providing excellent illumination of the area about site 100, both the omni-directional and multi-beam embodiments of site 100 may provide less than desirable communication under certain conditions. For example, where certain terrain conditions or other signal communication impediments exist, shadows may be formed in the radiation pattern in which signal communication is unavailable or unacceptable.

Figure 3B:
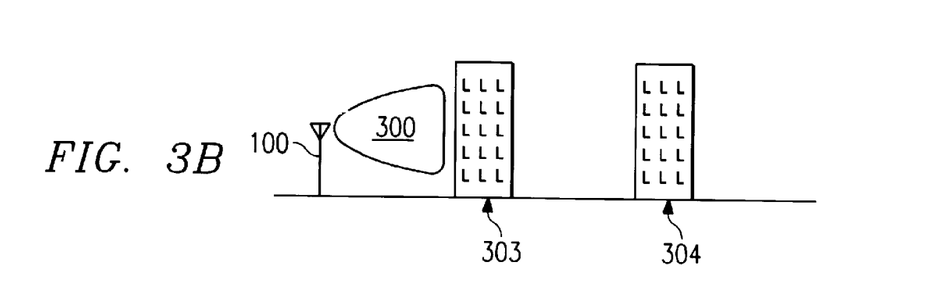
Figure 3C:
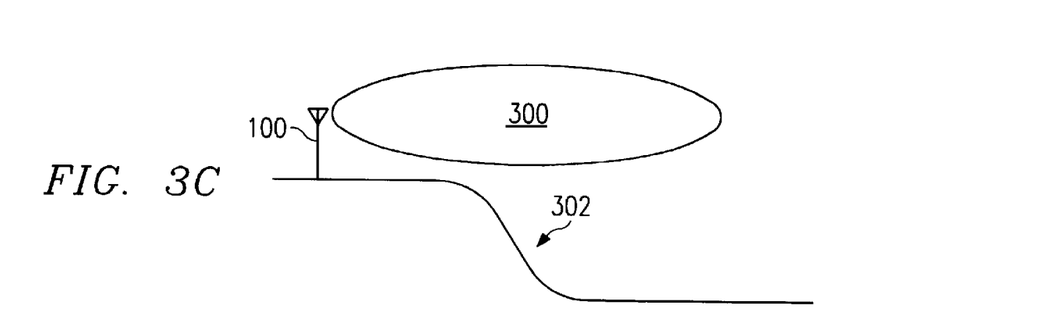

Directing attention to FIGS. 3A–3C examples of such communication impediments are illustrated. In FIG. 3A, hill 301 obstructs beam 300 such that communication is not possible with site 100 on the outboard side of hill 301. Likewise, in FIG. 3B, building 303 obstructs beam 300 such that communication with site 100 is not possible on the outboard side of building 303. Similarly, valley 302 of FIG. 3C may cause insufficient illumination by beam 300 in valley 302. The signal impediments illustrated in FIGS. 3A–3C are merely illustrative of conditions that may exist. However, regardless of the exact nature of the cause, it shall be appreciated that such inadequate coverage of some areas by beam 300 is typically undesirable.

Therefore, according to the present invention, communication signal re-transmission is provided to provide illumination of areas experiencing inadequate illumination from a communication site. Illustrated in FIG. 4, as repeater 400, is a preferred embodiment of a signal re-transmitter according to the present invention. As is common in repeater systems, antenna 401 may receive a signal such as that communicated from site 100. Thereafter, amplifier 406 may be used to increase the received signal's power, and antenna 402 utilized to re-transmit the signal. Of course, antennas 401 and 402 of the present invention may be any type of antenna. For example, antenna 402 may be an omni-directional or multi-beam antenna system as deemed advantageous.

In practice, antenna 401 is disposed at a location illuminated by site 100 in order to provide a signal transmitted therefrom to repeater 400. For example, referring again to FIGS. 3A–3C, antenna 401 may be located on top of hill 301 or at a point inboard of valley 302 or building 303. Antenna 402 would similarly be disposed at a location from which to illuminate the area previously experiencing inadequate illumination. For example, antenna 402 may be located on top of hill 301, in valley 302, or between buildings 303 and 304.

Figure 4:
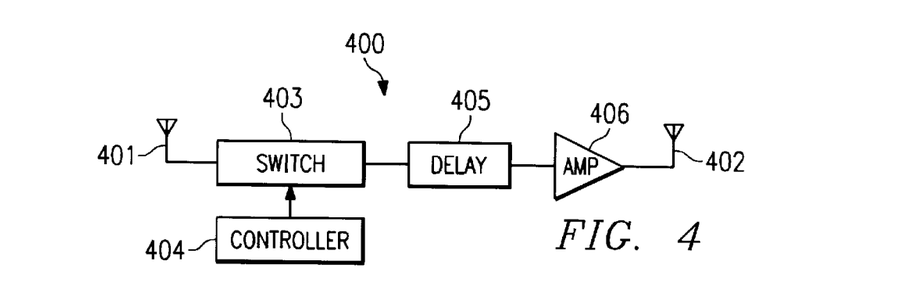
FIG. 4 illustrates a block diagram of a repeater of a preferred embodiment of the present invention.

However, it shall be appreciated that such positioning of antennas 401 and 402 may provide a feedback loop by which the re-transmitted signal may be combined with the original signal at the repeater. For example, where antenna 401 and antenna 402 are disposed on top of hill 301, use of an omni-directional antenna for antenna 402 is likely to provide such feedback, as antenna 401 is likely to be positioned within the radiation pattern of antenna 402. Although use of a directional antenna as antenna 402 might prevent such feedback in some circumstances, this is not always the case. For example, regardless of directionality, disposing antenna 402 between buildings 303 and 304 is likely to cause reflected signals capable of reception at antenna 401.

Furthermore, the use of directional antennas is not always desirable as the use of such may still render inadequate illumination of the area to be covered. Likewise, the use of reduced re-transmission power is often undesirable as inadequate illumination of the desired area may result.

One solution to the feedback problem might be to re-transmit the signal at a different frequency. Accordingly, antenna 401 would receive a selected signal as appears on a particular frequency while antenna 402 re-transmits the signal upon a different frequency. Therefore, the repeater could discriminate between the original signal and re-transmitted signal and, thus, avoid feedback.

However, this is often an undesirable solution as portions of the frequency spectrum will be unavailable for use within some areas and thus frequency band depletion is experienced. Furthermore, additional problems are introduced by such a solution as the device for which the re-transmitted signal is intended must re-tune to a second frequency in order to receive the re-transmitted signal. Therefore, such a solution to the aforementioned feedback problem is often not acceptable.

Accordingly, the present invention utilizes an inventive delay method in order to provide a re-transmitted signal decoupled from the original signal.

Referring again to FIG. 4, switch 403, controller 404, and delay 405 of a preferred embodiment of the present invention are illustrated. Operation of these components according to the present invention provides decoupling of the re-transmitted signal without the need to utilize a different frequency, even where antenna 402 is omni-directional and irrespective of power of the re-transmitted signal.

Figure 5:
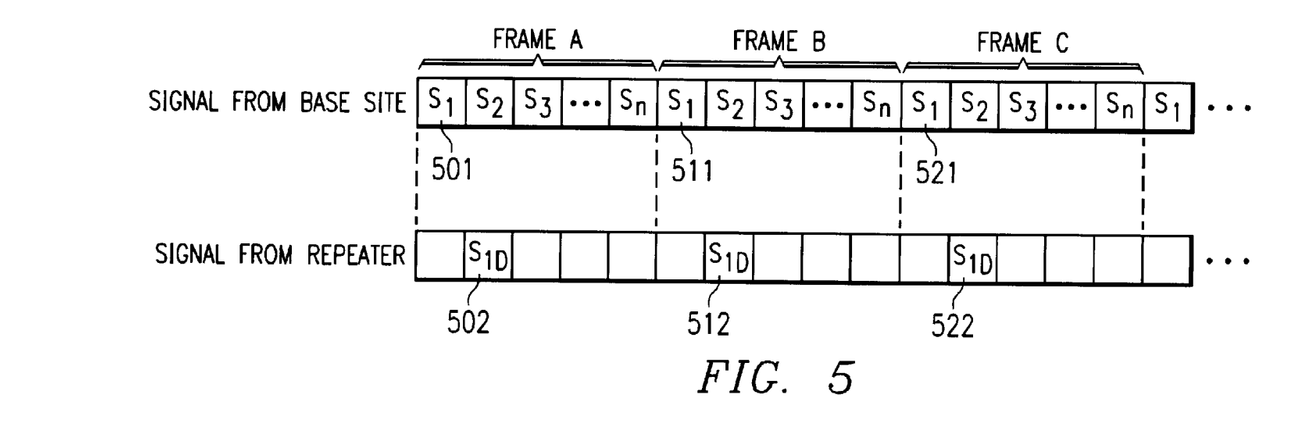
FIG. 5 illustrates a timing diagram of a re-transmitted signal in relation to its original signal according to a preferred embodiment of the present invention.

Directing attention to FIG. 5, a signal timing diagram of a repeater signal having the above described delay introduced in a TDMA base site signal, as shown in FIG. 2, is illustrated. Here it can be seen that the signal of burst 501 is delayed for re-transmission by the repeater a full burst period to coincide with burst 502. Likewise bursts 511 and 521 are delayed to coincide with bursts 512 and 522 respectively. Of course, there is no limitation to the delay of the re-transmitted signal being a single burst period. The delay introduced by the present invention may in fact be any number of burst periods which allow the signal from the base site to be utilized by the intended target. However, it shall be understood that the delay of the signal by the present invention at least a single burst period is necessary for the decoupling of the original signal and the re-transmitted signal.

Referring again to FIG. 5, it can be seen that the re-transmitted signal from the repeater includes signals originally associated with bursts 501, 511, and 521 of the base site signal to the exclusion of other signals. This is so because switch 403 under control of controller 404 shown in FIG. 4 operates to interrupt acceptance of signals from antenna 401 during re-transmission of a desired signal. It shall be appreciated that interruption of signal input into the repeater during the re-transmission of signals provides decoupling of the re-transmitted signal from the input, or original, signal. In this way the aforementioned feedback loop is eliminated from the repeater system without requiring output signal attenuation, the use of directional antennas, or the like.

However, signal $S_2$ shown in the timing diagram of the signal from the base site is not available for re-transmission by the repeater where a delay of a single burst period is utilized (i.e., re-transmission of signal $S_1$ by repeater 400 is occurring during the burst period in which signal $S_2$ is being transmitted by the base site and, therefore, the acceptance of signals by the repeater is terminated). Whereas, signal $S_3$ is available for re-transmission. This is so because during the burst period in which signal $S_3$ is being transmitted by the base site there is no re-transmission of signals occurring at the repeater and, therefore, signal $S_3$ may be accepted for re-transmission. Therefore, where a delay of a single burst period is introduced by the repeater of the present invention, only signals associated with alternating burst periods are available for repeating.

Of course, if it is desired to re-transmit signals having a relationship other than alternating burst periods, the delay introduced by delay 405 may be different than that of a single burst period. For example, the delay may be selected to be two burst periods. This selection of delay provides for the re-transmission of signals associated with adjacent burst periods (i.e., signal $S_1$ and signal $S_2$ could be re-transmitted during the burst periods originally associated with signal $S_3$ and signal $S_4$ respectively).

Moreover, the signal delay introduced by delay 405 for signals associated with different burst periods may be dynamically adjusted. For example, controller 404 may be coupled (not shown) to delay 405 in order to adaptively select an adjustable delay amount. In this embodiment of the present invention, various combinations of re-transmissions of signals could be realized, including both re-transmission of contiguous and non-contiguous burst period signals.

Selection of the burst periods for which to re-transmit signals and during which to re-transmit signals may depend on such considerations as a recipient communication unit which may best be served by a re-transmitted signal, or a particular burst period in which re-transmission may occur without interfering with a recipient of a signal utilizing the burst period chosen for use in re-transmission.

It shall be appreciated that, through the delayed re-transmission of a selected signal according to the present invention, no information with respect to this selected signal is lost. This is so because acceptance of input signals by the repeater of the present invention is terminated only during burst periods associated with a signal not being re-transmitted.

However, as re-transmission of a signal according to the present invention utilizes a second burst period associated with the original signal, interference between the re-transmitted signal and a signal associated with another recipient communication unit may occur. Such interference will be negligible where this other recipient communication unit is located near the base site, as the base site signal would then be significantly stronger than that of the repeater. Of course, the terrain conditions originally necessitating re-transmission of the signal may be utilized to reduce or eliminate such interference.

Additionally, as described above, the base site may utilize a multi-beam radiation pattern. An advantage of such a system is that the recipient unit utilizing the burst period associated with the re-transmission of a signal by the repeater may be operating within a beam such that interference with the re-transmitted signal is minimized or does not occur.

As described above, the selection of the burst period in which to re-transmit the signal may be purposefully selected in order to utilize a burst period in which interference between the two signals does not occur. A system which may be coupled to or included with the controller of the present invention in order to provide such intelligent control is disclosed in the co-pending, commonly assigned, U.S. patent application entitled "Method and Apparatus for Improved Control Over Cellular Systems" previously incorporated herein by reference.

Alternatively, the antenna of the repeater from which the re-transmission is accomplished may be directed, or otherwise adapted, so as not to illuminate an area in which interference between the two signals utilizing the same burst period can occur. For example, the antenna of the repeater may be focused away from the radiation pattern of the base site so that overlap of the two radiation patterns is minimized or eliminated.

Controller 404 may comprise any form of intelligent control device well known in the art, such as a general purpose processor-based system operating under the control of a switching algorithm providing switch timing information to switch 403. Such switch timing information may be predetermined in order to provide re-transmission of a preselected burst period or periods.

Alternatively, controller 404 may dynamically determine which signals associated with burst periods require re-transmission and, therefore, adjust the switch timing information in order to provide the desired re-transmitted signal. Such dynamic determinations may be made, for example, by controller 404 monitoring signal communication within the radiation pattern of repeater 400 in order to determine the propriety of re-transmission of a particular signal.

Additionally, or in the alternative, controller 404 may be embodied in or coupled to a controller system (not shown) for actively managing wireless communication between the base site and other units in communication therewith. Such a system is disclosed in the co-pending, commonly assigned, U.S. patent application entitled "Method and Apparatus for Improved Control Over Cellular Systems" previously incorporated herein by reference. In such an alternative embodiment, the switch timing of switch 403 may be determined through reference to information other than that independently available at the repeater.

Switch 403 of the present invention may be any device suitable for interrupting the communication of a signal from antenna 401 to the re-transmission apparatus. For example switch 403 may be a typical electronic circuit interruption device, well known in the art, switchably operating under control of controller 404. Alternatively, switch 403 may be an adjustable signal attenuation device operating under control of controller 404. Interruption of an input signal may be accomplished by such a device by controlling the attenuation to approach infinity and, thus, not allowing the signal to pass.

Delay 405 of the present invention may be any device suitable for providing a predetermined delay in the signal to be re-transmitted. Preferably, delay 405 is adapted to provide a delay, or delays, such that the re-transmitted signal coincides with a burst period of the original signal. It shall be appreciated that such delays theoretically are integer multiples of the length of the burst periods. However, in practice the delay introduced by delay 405 may be adjusted for propagation delays such as might be introduced by the components of repeater 400.

Regardless of the exact delay utilized by the present invention, delay 405 may be embodied in any number of forms. For example, delay 405 may utilize a length of cable selected to provide a predetermined delay.

Figure 6:
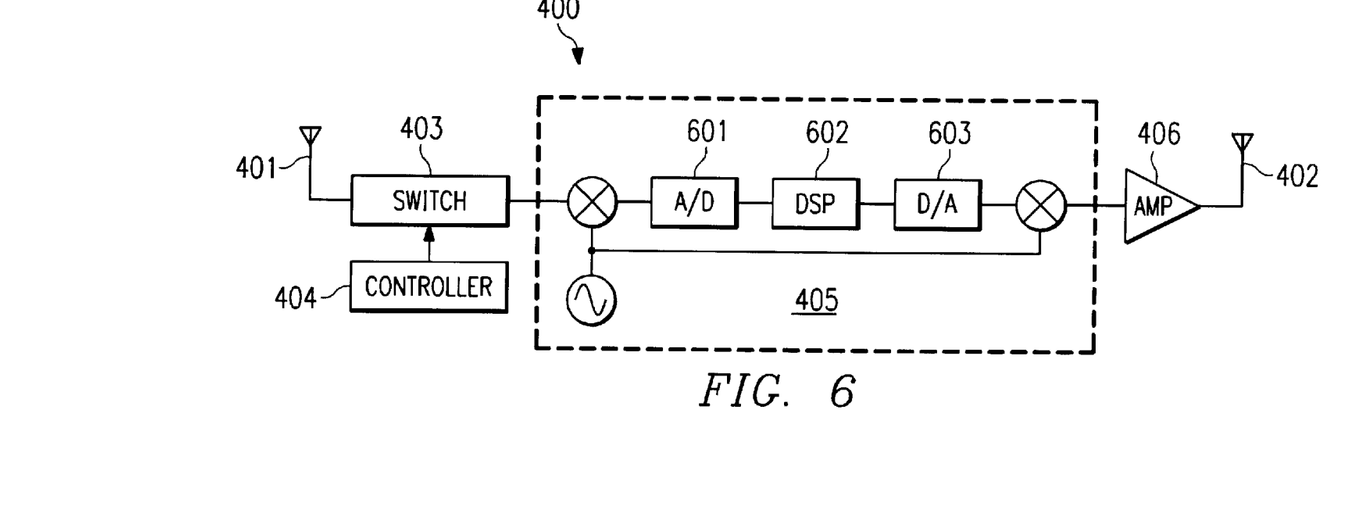
FIG. 6 illustrates a block diagram of a repeater of an alternative embodiment of the present invention.

However, it shall be appreciated that where the individual burst periods and, thus, the delays introduced are relatively lengthy (i.e., greater than a $\mu$sec) physical delay lines become awkward. Therefore, delay 405 may utilize other delay apparatus known in the art, such as surface acoustic wave (SAW) devices. Additionally, the repeater may utilize digital signal processing (DSP) as illustrated in the alternative embodiment shown in FIG. 6. Here analogue to digital (A/D) converter 601 provides an input signal to DSP 602. DSP 602 applies a digital delay to the signal which is then provided to digital to analogue (D/A) converter 603.

Amplifier 406 preferably provides gain to the re-transmitted signal, as it is expected that repeater 400 will be disposed at a point in the radiation pattern of base site 100 in which the original signal is appreciably attenuated. Of course, amplifier 406 may additionally, or in the alternative, provide other signal conditioning functions such as signal filtering or the like. Furthermore, where the re-transmitted signal does not require signal conditioning, amplifier 406 may be omitted, if desired.

It shall be appreciated that delay of a re-transmitted signal to coincide with a different burst period may require control of the intended recipient of the signal in order that the receiving unit may anticipate the signal in the proper burst period. For example, where the intended recipient is a mobile unit, communication may be occurring within the radiation pattern of the base site, and therefore within a particular burst period, until such time as the mobile unit falls within the radiation pattern of the repeater, and therefore advantageously operates within a delayed burst period.

Where a separate radio frequency (RF) channel, as in AMPS, for example, is utilized as a control channel, the repeater may transmit control information within the area of its effective radiation pattern on this RF control channel in order to enable a mobile unit operating therein to adjust its communication to the proper burst period. Similarly, where a control channel exists as information within the transmitted signal, such as frame or burst period header information, the repeater may adjust this information in order that the mobile operates on the proper delayed burst period when in range of the repeater. Additionally, timing information associated with the frame or burst period timing of the signal may be manipulated by the repeater to disguise to the receiving unit that a signal re-transmission has occurred.

Preferably, the repeater disguises the re-transmission of signals to both the base site and the remote communication unit to provide completely transparent re-transmission of signals. This may be accomplished by using any number of schemes, such as those described above, in both the forward and reverse channel. For example, if the base site numbers frames, the repeater may change numbers on the framing sequence. Of course, the repeater and base site may cooperate in such a way to provide transparent re-transmission to the remote communication unit although the base site is aware of such re-transmission and, possibly, even adapting to compensate for the re-transmission.

Of course, where the intended recipient of the re-transmitted signal is stationary (i.e., always remaining within the radiation pattern of the repeater), this intended recipient may simply be adjusted so as to operate within the burst period as delayed. For example, although a signal intended for a stationary recipient is initially associated with a first burst period as transmitted from the base site, the stationary recipient may be adapted to expect the signal during a delayed burst period as re-transmitted from the repeater.

Regardless of the method utilized to synchronize the recipient of the re-transmitted signal with the proper burst period, it shall be appreciated that the recipient operates within TDMA frames as defined at the base site. This provides for transparent operation of the repeater system of the present invention as the recipient need only select a different, delayed, burst period from which to receive a signal.

Furthermore, timing of the re-transmitted signal provides for efficient use of the frame, thus allowing re-transmission capacity to achieve one half that of the original signal. In explanation, where re-transmission of a signal directly coincides with a burst period of the original signal, and thus acceptance of signal input at the repeater is terminated, only the burst period for which the transmission occurs is unavailable for re-transmission of a signal by the repeater. Extending this logic throughout the duration of the frame, one half of the burst periods are then available for re-transmission according to the present invention where the re-transmission is synchronized with the original burst period timing.

Figure 9:
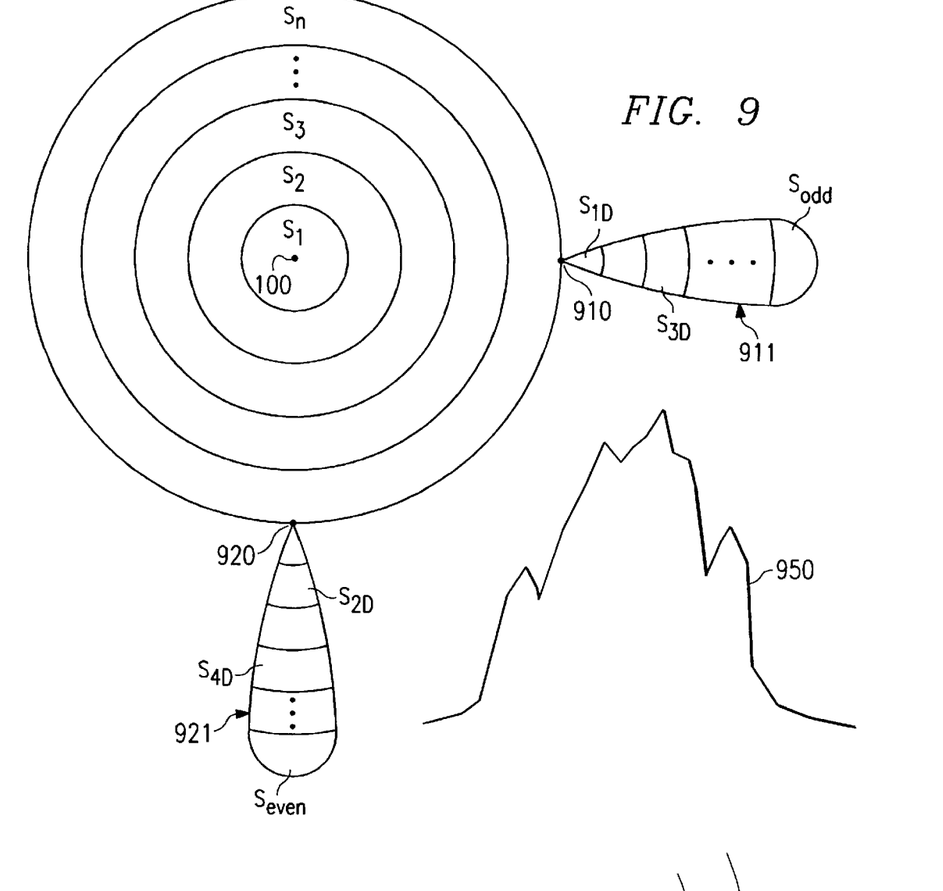
FIG. 9 illustrates a system utilizing multiple repeaters according to the present invention.

Additionally, in a system with sufficient isolation between at least two regions of the coverage area, due to antenna beam sloping, geographical features, or the like, a second repeater may also be operated to repeat signals from a particular communication site. Directing attention to FIG. 9, a system utilizing two repeaters, identified as repeaters 910 and 920 which in a preferred embodiment are constructed as repeater 400 of FIG. 4, are deployed to re-transmit signals in two isolated regions. As illustrated, isolation may be provided by shaping of the repeater antenna beams 911 and 921 so as not to overlap. Of course, isolation may be provided by any number of means such as natural terrain, illustrated by mountain 950.

By operating the second repeater to re-transmit the complementary set of time slots re-transmitted by the first repeater, the second one half of the burst periods are then available for re-transmission according to the present invention. Utilizing a controller (not shown) monitoring communications with the base site and/or repeaters, or other wise providing for the assigning of particular communication units to the time slots associated with each region, the full capacity of the original signal may be re-transmitted, albeit a portion of the full capacity by each repeater.

Of course, there is no limitation to the use of only two such repeaters. As many repeaters as deemed advantageous may be used according to the present invention. Moreover, there is no limitation to such multiple repeaters re-transmitting complementary sets of burst periods. For example, where it is advantageous to re-transmit the signal of a single burst period within areas defined by more than one repeater, each such repeater may re-transmit the signal. Likewise, it shall be appreciated that repeaters, according to the present invention, may be daisy chained in order to further extend the service area of a radiated signal.

It is anticipated that the repeater of the present invention will be utilized in a system including multiple transmission sites, such as are deployed in a cellular telephone system. Directing attention to FIG. 10, a system having two transmission sites, shown here as sites 1010 and 1020, and repeater 400 providing re-transmission of signals from site 1010 is shown. It shall be appreciated that sites 1010 and 1020 may provide any desired radiation pattern, such as those illustrated in FIGS. 1A and 1B.

Figure 10:
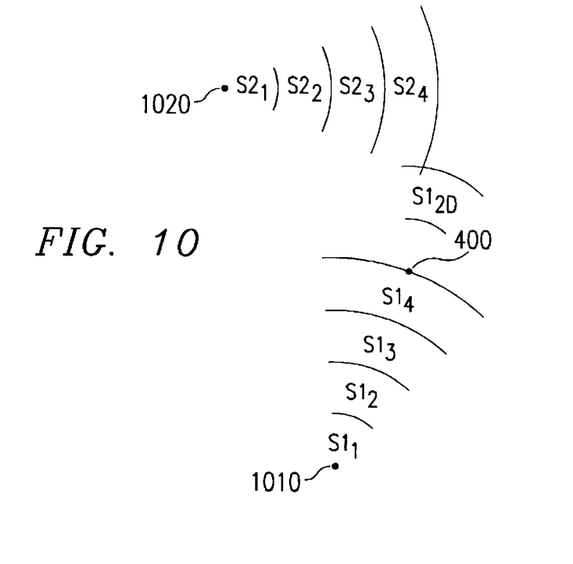
FIG. 10 illustrates a system including multiple base sites utilizing a repeater according to the present invention.

As shown in the system deployment illustrated in FIG. 10, the signal re-transmitted from repeater 400 may overlap that radiated from another transmission site, here site 1020. Accordingly, a preferred embodiment of the present invention utilizes burst period transmissions so as to minimize interference between such signals. For example, where the repeater is re-transmitting a signal from site 1010 in burst period two, identified in the illustration as $S1_2$, this re-transmitted signal may interfere with a signal from site 1020 in burst period three, identified in the illustration as $S2_3$ (remembering that the re-transmitted signal is delayed according to the present invention). However, by avoiding transmission of a signal in burst period three of site 1020 this interference may be avoided. Of course, not utilizing a burst period to transmit a signal results in reduction in capacity. Therefore, in a preferred embodiment, site 1020 utilizes a multi-beam radiation pattern, as illustrated in FIG. 1B, and thus allows for utilization of burst period three in a beam not overlapped by the signal of repeater 400. As such interference may be minimized while optimizing coverage an maintaining capacity.

It shall be appreciated that the aforementioned utilization of burst periods may be substantially permanently fixed, such as at the time of deployment, so as to provide only certain burst periods within select regions to achieve the advantages discussed above. Alternatively, utilization of burst periods may be dynamic, such as through the use of a control system (not shown), monitoring communication at the base sites and/or repeater, for actively managing wireless communication between the base site and other units in communication therewith. For example the control system may be embodied in a general purpose processor-based system having instructions and system interfacing to accomplish such a task. An example of a communication network control system is disclosed in the co-pending, commonly assigned, U.S. patent application entitled "Method and Apparatus for Improved Control Over Cellular Systems" previously incorporated herein by reference.

Although a preferred embodiment of the present invention has been shown with respect to the forward channel, it shall be appreciated that the present invention is equally useful in the reverse channel. Directing attention to FIG. 7, a signal timing diagram of forward and reverse channel repeater signals are illustrated. It shall be appreciated that the TDMA frame illustrated in FIGS. 2 and 5 is again represented in FIG. 7. However, for clarity in showing the timing of the reverse channel with respect to the forward channel, the number of burst periods "n" has been selected to be eight in FIG. 7. The number of burst periods chosen for this example is arbitrary, and is not intended to limit the present invention in any way.

Figure 7:
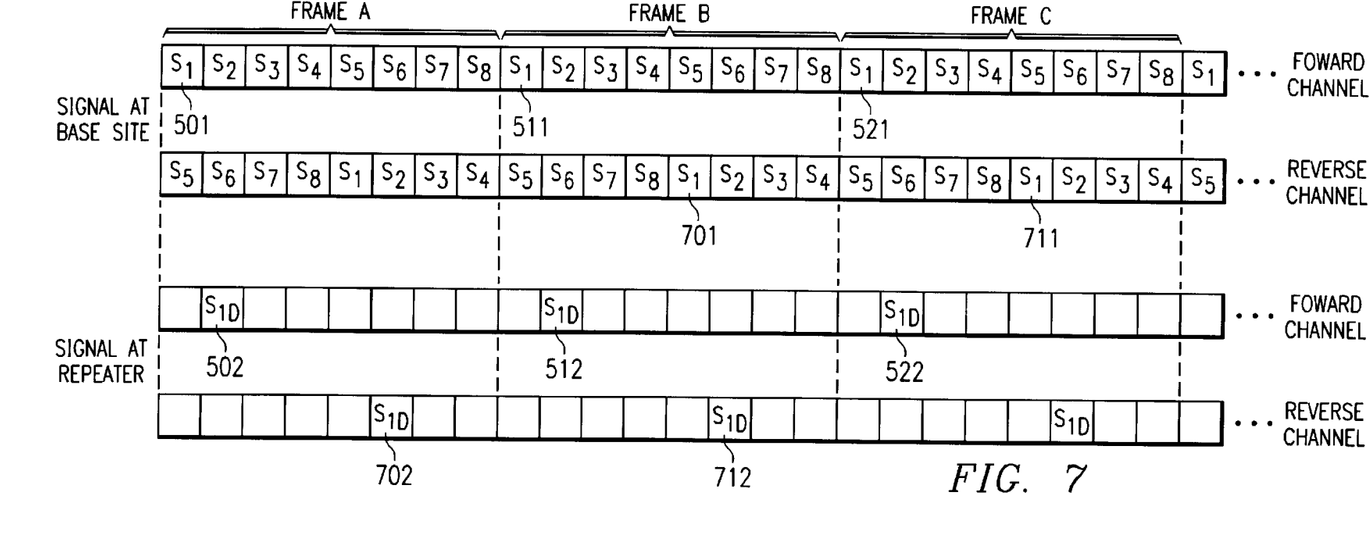
FIG. 7 illustrates a timing diagram of forward and reverse channel transmissions according to a preferred embodiment of the present invention.

The reverse channel includes return signal burst periods synchronized with the burst periods of the forward channel. Here, the reverse channel burst period for each particular signal is offset from the forward burst period by four such burst periods. However, it shall be appreciated that the offset selected is arbitrary and is not a limitation of the present invention.

As in the example of FIG. 5, the desired signal of the forward channel in FIG. 7 is delayed by the repeater of the present invention a single burst period (of course, as described above, any delay amount may be selected). As described above, the delay introduced results in the signal associated with burst 501 being re-transmitted by the repeater at burst period 502, which coincides with a burst period of a different signal at the base site.

Also as described above, the recipient of the re-transmitted signal operates with the same frame timing as that of the original signal. Therefore, the reverse channel signal at the repeater is offset from the forward channel by the same number of burst periods as is the original signal. In the example of FIG. 7 this offset is four burst periods. However, it shall be appreciated that the delay associated with decoupling the input signal from the re-transmitted signal according to the present invention results in the reverse channel signal being provided to the repeater subsequent to the burst period of the original signal to which it corresponds (i.e., signal $S_{1D}$ of the reverse channel at the repeater is associated with a burst period following that of signal $S_1$ of the original signal to which it corresponds).

In order to align the reverse channel signals, the delay associated with the re-transmission of reverse channel signals by the repeater of the present invention is adapted to provide the reverse channel signal at a burst period synchronized with the original signal. For example, signal $S_{1D}$ of burst period 702 of the reverse channel at the repeater is delayed seven burst periods in order to coincide with burst period 701 of the reverse channel of the base site, where a signal associated with the particular recipient unit is expected. Likewise, signal $S_{1D}$ of burst period 712 is delayed seven burst periods in order to coincide with burst period 711 at the base site.

It shall be appreciated that the relationship of reverse channel delay to that of the forward channel may be generally expressed as:

$$D_R = n - D_F$$

Where $D_R$ is the reverse channel delay in numbers of burst periods, $D_F$ is the forward channel delay in numbers of burst periods, and n is the number of burst periods per frame.

Figure 8:
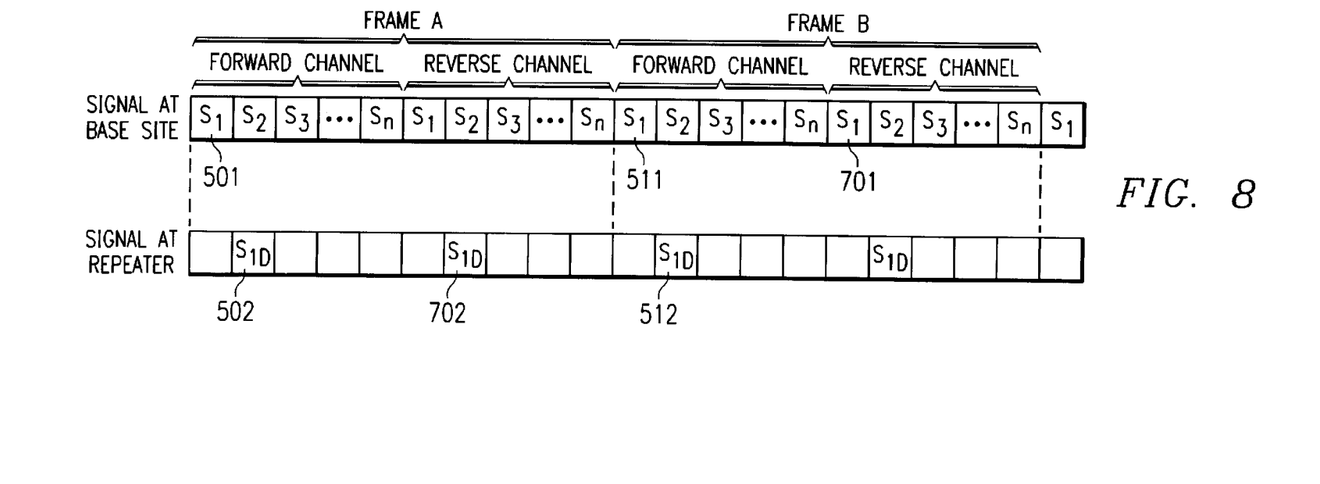
FIG. 8 illustrates a timing diagram of forward and reverse channel transmissions according to an alternative embodiment of the present invention.

Although the above discussion assumes a discrete forward and reverse RF channel, it shall be appreciated that the present invention is equally useful in providing duplexed communication in a TDMA system utilizing a portion of the frame for forward channel communication and a portion of the frame for reverse channel communication. A signal timing diagram for a time division multiplexed system according to the above described signal timing is shown in FIG. 8. It shall be appreciated that the above described general expression for the reverse channel delay holds for this embodiment of the invention.

Although the present invention and its advantages have been described in detail, it should be understood that various changes, substitutions and alterations can be made herein without departing from the spirit and scope of the invention as defined by the appended claims.

What is claimed is:

1. A system for providing re-transmission of selected components of a signal, said system comprising:

means for accepting said selected components of said signal to the exclusion of other components of said signal;

means for manipulating said accepted signal components wherein said manipulated signal components include a selected attribute corresponding to an attribute of ones of said excluded other components;

means for controlling said accepting means wherein said accepting means operates to terminate acceptance of said signal components at least in part as a function of said selected attribute; and means for transmitting said manipulated signal components.

2. The system of claim 1, wherein said controlling means is operable to terminate acceptance of said excluded signal components during transmission of said manipulated signal components by said transmitting means.

3. The system of claim 2, wherein ones of said transmitted manipulated signal components are associated with a forward channel and other ones of said manipulated signal components are associated with a reverse channel.

4. The system of claim 2, wherein said signal is associated with a first base site of a plurality of base sites and said selected attribute is selected so as to minimize interference with transmissions associated with a second base site of said plurality of base sites.

5. The system of claim 2, wherein said signal is associated with a first base site of a plurality of base sites and a second base site of said plurality of base sites selectively utilizes signal attributes so as to avoid interference with transmission of said manipulated signal components.

6. The system of claim 1, further comprising:

means for controlling an intended recipient of said accepted signal components to receive said manipulated signal components.

7. The system of claim 6, wherein said last mentioned controlling means comprises:

means for transmitting information with respect to said selected attribute over a control channel.

8. The system of claim 6, wherein said last mentioned controlling means comprises:

means for modifying control information associated with said manipulated signal components to include information with respect to said selected attribute.

9. The system of claim 1, further comprising:

means for providing transparent re-transmission of said manipulated signal components to a communication unit associated with ones of said accepted signal components.

10. The system of claim 9, wherein said providing means comprises:

means for manipulating signalling information to cause said communication unit to be unaware of said manipulated attribute of said re-transmitted manipulated signal components.

11. The system of claim 9, wherein said providing means comprises:

means for manipulating timing information to cause said communication unit to be unaware of said manipulated attribute of said re-transmitted manipulated signal components.

12. The system of claim 1, wherein ones of said accepted signal components and ones of said excluded signal components form a frame of a TDMA signal.

13. The system of claim 12, wherein said selected attribute is a timing characteristic associated with a particular burst period of said TDMA frame.

14. The system of claim 13, wherein said timing characteristic is selected in order reduce interference from re-transmission of ones said accepted signal components with an intended recipient of ones of said excluded signal components.

15. The system of claim 1, further comprising:
means for selecting said selected attribute through reference to communications utilizing said excluded signal components.

16. The system of claim 1, further comprising:
means for selecting said selected signal components through reference to communications utilizing said selected signal components.

17. The system of claim 1, wherein said signal is associated with a cellular telecommunications system.

18. The system of claim 1, wherein said accepting means comprises:
a device providing switchable signal communication between an antenna and said manipulating means.

19. The system of claim 18, wherein said device is selected from the group consisting of:
a switch;
an attenuator; and
a filter.

20. The system of claim 1, wherein said manipulating means comprises:
a signal delay device operable to delay said accepted signal components a predetermined amount of time.

21. The system of claim 20, wherein said delay device comprises a device selected from the group consisting of:
a predetermined length of cable;
a digital signal processor; and
a surface acoustic wave device.

22. The system of claim 1, wherein said controlling means comprises:
a processor based system operating under control of a switching algorithm, wherein said switching algorithm utilizes information with respect to said signal in order to control said accepting means to terminate acceptance of ones of said signal components.

23. The system of claim 22, wherein said information includes timing information of burst periods of a TDMA frame.

24. A method for providing re-transmission of selected components of a signal, said method comprising the steps of:
accepting said selected components of said signal for re-transmission;
rejecting other components of said signal;
manipulating said accepted signal components to include a selected attribute corresponding to an attribute of ones of said rejected other signal components;
controlling said rejecting step as a function of said selected attribute; and
transmitting said manipulated signal components.

25. The method of claim 24, wherein said controlling step is operable to terminate acceptance of said excluded signal components during transmission of said manipulated signal components.

26. The method of claim 24, further comprising the step of:
controlling a communication unit associated with ones of said accepted signal components.

27. The method of claim 26, wherein said last mentioned controlling step comprises the step of:
transmitting control information over a control channel instructing said communication unit to adjust communications to correspond to said selected aspect.

28. The method of claim 26, wherein said last mentioned controlling step comprises the step of:
modifying control information associated with said signal components thereby instructing said communication unit to adjust communications to correspond to said selected aspect.

29. The method of claim 24, further comprising the step of:
providing transparent re-transmission of said manipulated signal components to a communication unit associated with ones of said accepted signal components.

30. The method of claim 29, wherein said providing step comprises the step of:
manipulating signalling information to cause said communication unit to be unaware of said manipulated attribute of said re-transmitted manipulated signal components.

31. The method of claim 29, wherein said providing step comprises the step of:
manipulating timing information to cause said communication unit to be unaware of said manipulated attribute of said re-transmitted manipulated signal components.

32. The method of claim 24, wherein ones of said accepted signal components and ones of said excluded signal components form a frame of a TDMA signal.

33. The method of claim 32, wherein said selected attribute is a timing characteristic associated with a burst period of said TDMA frame.

34. The method of claim 33, wherein said timing characteristic is selected in order reduce interference from re-transmission of ones said manipulated signal components with a communication unit utilizing ones of said excluded signal components.

35. The method of claim 24, further comprising the step of:
selecting said selected attribute through reference to information with respect to said excluded signal components.

36. The method of claim 24, further comprising the step of:
selecting said selected signal components through reference to communications parameters of a communication unit utilizing ones of said selected signal components.

37. A system for use in a communication network having a first communication site and a second communication site, wherein re-transmission of selected TDMA periods of a first signal associated with said first communication site is provided, said system comprising:
a receiver accepting said selected TDMA periods of said first signal and excluding other TDMA periods of said first signal;
a device adjusting said accepted TDMA periods to correspond with a TDMA period of ones of said excluded other TDMA periods;
a transmitter operable to transmit said adjusted TDMA periods coincident with ones of said excluded other TDMA periods; and
a controller operable with communication information from said first communication site and said second communication site selecting ones of said TDMA periods to associate with particular information to avoid interference with said transmitted adjusted TDMA periods.

38. The system of claim 37, wherein said controller comprises:
means for causing information initially associated with a particular TDMA period of said second communication site coinciding with an adjusted TDMA period of said adjusted TDMA periods to be associated with an alternative TDMA period.

39. The system of claim 37, wherein said controller comprises:
means for controlling adjusting of said accepted TDMA periods to avoid transmission of said adjusted TDMA periods coincident with information associated with a particular TDMA period of said second communication site.

40. The system of claim 37, wherein said controller comprises:
means for causing transmission of information associated with a particular TDMA period of said second communication site coinciding with a TDMA period of said transmitted adjusted TDMA periods to be restricted to a region substantially isolated from transmission of said adjusted TDMA period.

41. The system of claim 37, wherein said adjusting device comprises:
means for controlling an intended recipient of said accepted TDMA periods to receive said adjusted TDMA periods.

42. The system of claim 41, wherein said controlling means comprises:
means for transmitting information with respect to said adjusted TDMA period over a control channel.

43. The system of claim 41, wherein said controlling means comprises:
means for adjusting control information associated with said accepted TDMA periods to reflect said adjustment of said adjusted TDMA period.

44. A system for providing repeated signals decoupled from an input signal, said system comprising:
means for accepting said input signal wherein said accepting means is operable to selectively terminate acceptance of signals;
means for delaying said accepted input signal a predetermined period of time; and
means for controlling said accepting means wherein said accepting means operates to selectively terminate acceptance of signals as a function of said predetermined period of time.

45. The system of claim 44, further comprising:
means for transmitting said accepted input signal wherein said transmitted accepted input signal is delayed said predetermined period of time.

46. The system of claim 45, wherein said signal delay is provided by a delay apparatus selected from the group consisting of:
a length of transmission cable;
a surface acoustic wave device; and
a digital signal processor.

47. The system of claim 45, wherein said controlling means is operable to terminate acceptance of signals during transmission of said accepted input signal by said transmitting means.

48. The system of claim 44, further comprising:
means for providing a control channel signal operable to instruct an intended recipient of said accepted input signal with respect to said predetermined period of time.

49. The system of claim 44, wherein said input signal includes a burst period of a TDMA signal.

50. The system of claim 49, wherein said predetermined period of time is approximately an integer multiple of the duration of said burst period.

51. The system of claim 49, wherein said predetermined period of time is selected in order that said repeated signal does not substantially interfere with a signal of a different burst period of said TDMA signal.

52. The system of claim 49 wherein said input signal is transmitted from a first cellular telecommunication device and is directed toward a select second cellular telecommunication device.

53. A signal repeater apparatus providing re-transmission of selected portions of an input signal, wherein said input signal is substantially free of feedback associated with the re-transmitted signal, said apparatus comprising:
a switchable input operable to admit said selected portions of said input signal;
a signal delay device operable to introduce a predetermined delay with respect to said admitted portions of said input signal; and
a controller operable to switch said switchable input to selectively refuse portions of said input signal not selected, wherein occurrence of said refused portions of said input signal corresponds to said predetermined delay.

54. The apparatus of claim 53, wherein said switchable input is a switch operating under control of said controller.

55. The apparatus of claim 53, wherein said switchable input is a signal attenuation device operating under control of said controller.

56. The apparatus of claim 53, wherein said delay device includes a predetermined length of cable.

57. The apparatus of claim 53, wherein said delay device includes a surface acoustic wave device.

58. The apparatus of claim 53, wherein said delay device includes a digital signal processor.

59. The apparatus of claim 53, wherein said controller operates to refuse portions of said input signal during re-transmission of said admitted signal portions.

60. The apparatus of claim 53, wherein said input signal includes burst periods of a TDMA signal.

61. The apparatus of claim 60, wherein said predetermined period of time is substantially an integer multiple of the duration of one of said burst periods.

62. The apparatus of claim 60, wherein said predetermined period of time is selected in order that said re-transmitted portions of said input signal do not substantially interfere with a denied signal portion.

63. A cellular telecommunication signal repeater apparatus providing re-transmission of selected bursts of a TDMA input signal, wherein said input signal is substantially free of feedback associated with the re-transmitted signal, said apparatus comprising:
a switchable input operable to admit said selected bursts of said input signal;
a signal delay device operable to introduce a predetermined delay with respect to said admitted bursts of said input signal, said predetermined delay substantially corresponding to a duration of the bursts of said TDMA input signal; and
a controller operable to switch said switchable input to selectively deny bursts of said input signal not selected, wherein occurrence of said denied bursts of said input signal substantially correspond to said predetermined delay, and wherein said controller operates to deny portions of said input signal during re-transmission of said admitted signal portions.

* * * * *